United States Patent [19]

Sakanaka et al.

[11] Patent Number: 4,639,508

[45] Date of Patent: Jan. 27, 1987

[54] PROCESS FOR PRODUCING GRANULAR COMPOSITION OF ETHYLENETHIOUREA-CHLOROPRENE RUBBER

[75] Inventors: Yasuhiro Sakanaka; Shuichi Okuzono, both of Shin-nanyo, Japan

[73] Assignee: Toyo Soda Manufacturing Co., Ltd., Shin-nanyo, Japan

[21] Appl. No.: 605,209

[22] Filed: Apr. 30, 1984

Related U.S. Application Data

[63] Continuation of Ser. No. 199,056, Oct. 20, 1980, abandoned.

[30] Foreign Application Priority Data

Jan. 16, 1980 [JP] Japan .................................. 55-2603

[51] Int. Cl.⁴ ........................... C08C 1/00; C08K 5/36
[52] U.S. Cl. ..................................... 528/486; 525/348; 528/487
[58] Field of Search ................. 525/348; 528/487, 486

[56] References Cited

U.S. PATENT DOCUMENTS

| | | | |
|---|---|---|---|
| 2,844,564 | 7/1958 | Hayes | 525/352 |
| 2,888,444 | 5/1959 | Roberts | 525/351 |
| 3,012,985 | 12/1961 | Zakheim | 525/343 |
| 3,179,637 | 4/1965 | Brodt | 525/349 |
| 4,031,302 | 6/1977 | Shimizu | 528/486 |

*Primary Examiner*—Christopher Henderson
*Attorney, Agent, or Firm*—Oblon, Fisher, Spivak, McClelland & Maier

[57] ABSTRACT

A granular composition of ethylenethiourea-chloroprene rubber is produced by adding dropwise a mixture of chloroprene rubber latex and ethylenethiourea at a ratio of 5–100 wt. % per rubber of said rubber latex and a macromolecular polyanion having carboxyl group or hydroxyl group at a ratio of 2–8 wt. % per rubber of said rubber latex lower than 10° C. into an aqueous solution containing at least one of alkaline earth metal salt at lower than 10° C. for form granule and then, dehydrating and drying the granule.

5 Claims, No Drawings

PROCESS FOR PRODUCING GRANULAR COMPOSITION OF ETHYLENETHIOUREA-CHLOROPRENE RUBBER

This application is a continuation of Ser. No. 199,056, now abandoned.

BACKGROUND OF THE INVENTION

1. Field of the Invention

The present invention relates to a process for producing a granular composition of ethylenethiourea-chloroprene rubber which is a noble vulcanization-accelerator for chloroprene rubber.

2. Description of the Prior Arts

In the application of chloroprene rubber, especially non-sulfur modified type of chloroprene rubber, ethylenethiourea has been usually used as a vulcanization accelerator. This is different from the application of the other diene type rubbers. Recently, it has been considered that the use of ethylene thiourea causes environmental hygiene problem. Ethylenethiourea is usually in a form of fine powder, and easily scattered in its handling. In the processing of the rubber by a roll type mixer or Bunbury mixer, it causes trouble breathed into body through nostrils. It is necessary to prevent breathing of the dust of ethylenethiourea by operating in the special conditions.

The inventors have started to prevent scattering of the dust and have invented a process for producing a granular composition of ethylenethiourea-chloroprene rubber as a combination of ethylenethiourea with chloroprene rubber.

SUMMARY OF THE INVENTION

It is an object of the invention to produce a granular composition of ethylenethiourea-chloroprene rubber as a vulcanization accelerator which is not scattered to be breathed.

The foregoing and other object of the invention has been attained by providing a process for producing granular composition of ethylenethiourea-chloroprene rubber by adding dropwise a mixture of chloroprene rubber latex and ethylenethiourea at a ratio of 5–100 wt. % per rubber of said rubber latex and a macromolecular polyanion having carboxyl group or hydroxyl group at a ratio of 2–8 wt. % per the rubber, at lower than 10° C. into an aqueous solution containing at least one of alkaline earth metal salt at lower than 10° C. to form granule and then, dehydrating and drying the granule.

DETAILED DESCRIPTION OF THE PREFERRED EMBODIMENTS

The granular composition of ethylenethiourea chloroprene rubber useful as the vulcanization-accelerator is produced by adding dropwise a mixture of chloroprene rubber latex, ethylenethiourea and a macromolecular polyanion having carboxyl group or hydroxyl group at lower than 10° C. into an aqueous solution containing at least one of alkaline earth metal salts at lower than 10° C. to form the granule and then dehydrating and drying the granule.

In accordance with the present invention, a granular chloroprene rubber containing uniformly dispersed ethylenethiourea is produced by adding dropwise a mixture of chloroprene rubber latex, ethylenethiourea and a macromolecular polyanion at specific ratios at lower than 10° C., into an aqueous solution of the alkaline earth metal salt to form a granule whereby a loss of a water soluble ethylenethiourea is prevented to obtain the granular composition in high yield.

The chloroprene rubber latex used in the present invention is an anion type latex obtained by the conventional polymerization of 2-chloro-1,3-butadiene (chloroprene) or a mixture of chloroprene and a comonomer such s styrene, acrylonitrile, methylmetacrylate, 2,3-dichloro-1,3-butadiene, 1-chloro-1,3-butadiene, butadiene, vinyl chloride or a mixture thereof in an aqueous emulsion with an anionic emulsifier such as rosin soap. The molecular weight of the rubber is controlled by a chain transfer agent such as mercaptans.

The resulting chloroprene rubber latex usually contains 10–60 wt. % of the rubber component. The ratio of ethylenethiourea to the chloroprene rubber latex is in a range of 5–100 wt. % per the rubber component of the latex. The concentration of the aqueous solution of ethylenethiourea is usually in a range of 3–40 wt. %, preferably 5–30 wt. %.

The macromolecular polyanions having carboxyl group or hydroxyl group used in the present invention include konjak mannan, agar, carragheenin, sodium alginate, carboxymethylcellulose, sodium polyvinylsulfonate, copolymers of a vinyl monomer and acrylic acid of maleic anhydride and so on. It is especially preferable to use sodium alginate. The macromolecular polyanion is incorporated at a ratio of 2–8 wt. % preferably 4–6 wt. % per the rubber component of the latex. It is necessary to maintain a viscosity of the aqueous solution of the macromolecular polyanion to higher than 3,000 cps.

In the preparation of the mixture of the chloroprene rubber latex, ethylenethiourea and the macromolecular polyanion, it is possible to mix these components and to cool the mixture at lower than 10° C. In order to improve the dispersibility, however, it is preferable to employ a process for dissolving ethylenethiourea in an aqueous solution of the polyanion at higher temperature and mixing it with the rubber latex, and then, cooling the mixture at lower than 10° C. The viscosity of the mixed latex is usually in a range of 1,200–2,400 cps, preferably 1,500–2,200 cps. The resulting mixture is added dropwise to the aqueous solution of at least one of the alkaline earth metal salts at lower than 10° C. to obtain granular chloroprene rubber containing ethylenethiourea.

The alkaline earth metal salts can be chlorides of beryllium, magnesium, calcium, barium, strontium, and a mixture thereof. It is preferable to use calcium chloride or barium chloride. The concentration of the aqueous solution of the alkaline earth metal salts is usually in a range of 1–10 wt. %, preferably 2–6 wt. %.

The particle diameter of the granular chloroprene rubber containing ethylenethiourea can be controlled depending upon a viscosity of the mixed latex, an amount of the macromolecular polyanion, a diameter of a nozzle for dropping and a dropping speed.

The granular chloroprene rubber containing ethylenethiourea granulated by the above-mentioned operation is dehydrated by any conventional process such as the use of a centrifugal separator and dried in a mild condition under a reduced pressure whereby the rubber granule having a particle diameter of 2.0–3.4 mm is obtained.

The dusting of ethylenethiourea does not form from the granular composition of ethylenethiourea chloroprene rubber obtained by the process of the invention.

Thus safety is remarkably high and handling is easy and dispersibility is high because of the form of granule. In a carbon master batch of chloroprene rubber containing carbon black, it is usual to cause coloring and gelation in the storage, however, the granular composition of ethylenethiourea chloroprene rubber of the invention does not cause such trouble in the drying or in the storage and can be used as the vulcanization-accelerator as described below.

When cloroprene rubber is vulcanized by compounding a suitable amount of the granular composition of ethylenethiourea-chloroprene rubber obtained by the invention, the vulcanized rubber imparts the same vulcanization characteristics and tensile characteristics as those of the vulcanized product obtained by conventionally using ethylenethiourea as shown in the following tests.

The present invention will be further illustrated by certain examples and references which are provided for purposes of illustration only and are not intended to be limiting the present invention.

PREPARATION OF CHLOROPRENE RUBBER LATEX USED IN THE EXAMPLE

An alkaline aqueous emulsion of 100 wt. parts of chloroprene, 0.2 parts of n-dodecylmercaptan stabilized with 3.6 wt. parts of potassium rosin soap and 0.5 wt. part of sodium formaldehyde-naphthalene sulfonate condensates, was prepared, and kept at 40° C. and 1.0 wt part of 1.5% aqueus solution of hydrosulfite was added and then 0.5% aqueous solution of potassium persulfate was added dropwise to carry out the polymerization. When a conversion reached to 70%, 0.1 wt. part of t-butyl catechol and 0.1 wt. part of phenothiazine were added to stop the polymerization and then unreacted chloroprene was distilled off by stripping to obtain chloroprene rubber latex having a solid content of 39.6%.

EXAMPLE 1

A mixed latex having a viscosity of 1,700 cps was prepared by mixing 100 wt. parts of the chloroprene rubber latex with 76 wt. parts of an aqueous solution obtained by dissolving 1.6 wt. parts of sodium alginate and 17.5 wt. parts of ethylenethiourea at 80° C., under stirring. The mixture was cooled to 5° C. and then, was added dropwise through a dropping nozzle having a diameter of 2 mm into 2% aqueous solution of calcium chloride kept at 5° C. to obtain granular chloroprene rubber having average particle diameter of 4.6 mm. The resulting granular chloroprene rubber was separated by a filtration and dried at 50° C. under a reduced pressure to obtain granular composition of ethylenethiourea-chloroprene rubber having average particle diameter of 3.0 mm and having a volatile matter content of less than 1 wt. %. The resulting granular rubber contain 40 wt. parts of the ethylenethiourea component per 100 wt. parts of the rubber.

EXAMPLE 2

In accordance with the process of Example 1, except using carboxymethylcellulose instead of sodium alginate and using an aqueous solution obtained by dissolving 2.4 wt. parts of carboxymethylcellulose and 11.5 wt. parts of ethylenethiourea at 80° C., a granulation was carried out to obtain a granular chloroprene rubber which contained 25 wt. parts of the ethylenethiourea component per 100 wt. parts of the rubber.

Each granular composition of ethylenethiourea-chloroprene rubber obtained in Example 1 or 2 was comprised in each composition shown in Table 1 and the mixture was milled and press-vulcanized at 150° C. for 30 minutes and each tensile test of the vulcanized product was carried out. The results of the tests are also shown in Table 1. In Test 1, and 2, the granular composition of ethylenethiourea-chloroprene rubber was compouned in an amount corresponding to 0.5 wt. part of ethylenethiourea used in Referenece 1 as the vulcanization accelerator. As it is clear from Table 1, the tensile characteristics are the same as those of Reference 1 using ethylenethiourea. It is clear that the granular composition of ethylenethiourea-chloroprene rubber obtained by the process of the invention can be satisfactory used as the vulcanization accelerator.

TABLE 1

|  | (part by weight) | | |
| --- | --- | --- | --- |
|  | Test 1 | Test 2 | Reference 1 |
| Chloroprene rubber*1 | 100 | 100 | 100 |
| Magnesium oxide | 4 | 4 | 4 |
| Stearic acid | 1 | 1 | 1 |
| Phenyl-$\beta$-naphthylamine | 2 | 2 | 2 |
| SRF carbon black | 29 | 29 | 29 |
| Zinc oxide | 5 | 5 | 5 |
| Ethylenethiourea | 0 | 0 | 0.5 |
| Granular rubber of Example 1 | 1.25 | 0 | 0 |
| Granular rubber of Example 2 | 0 | 2 | 0 |
| Tensile test | | | |
| $ML_{1+4}$ of rubber (100° C.) | 64 | 62 | 63 |
| 300% tensile stress (kg/cm$^2$) | 125 | 124 | 121 |
| Tensile strength | 244 | 246 | 231 |
| Elongation (%) | 510 | 510 | 480 |
| Hardness (JIS) | 59 | 57 | 56 | note:
*1Chloroprene rubber Skyprene B-30 manufactured by Toyo Soda.

We claim:

1. A process for producing a granular composition of ethylenethiourea-chloroprene rubber which comprises adding drop-wise a mixture of chloroprene rubber latex and a 3-40 wt. % solution of ethylenethiourea in water at a rate of 5-100 wt. % per rubber component of said rubber latex and the macromolecular polyanion sodium alginate at a ratio of 2-8 wt. % per rubber of said rubber latex, at lower than 10° C. into an aqueous solution containing at least one alkaline earth metal salt at lower than 10° C. to form granules, separating the granules from the aqueous solution in which they are formed and then, dehydrating and drying the granules.

2. The process according to claim 1, wherein said chloroprene rubber latex is an anionic latex obtained by an emulsion polymerization of chloroprene or a mixture of chloroprene and a comonomer in the presence of an emulsifier with a chain transfer agent.

3. The process according to claim 1, wherein the viscosity of the mixture of the chloroprene rubber latex, the ethylenethiourea and the macromolecular polyanion sodium alginate is 1,200 to 2,400 cps, the alkaline earth metal salt is calcium chloride or barium chloride in a concentration range of 1 to 10%, and the granules are separated by filtration from the aqueous solution in which they are formed.

4. The process according to claim 1, wherein the concentration of said ethylenethiourea solution in water is 5 to 30 wt. %.

5. The process according to claim 1, wherein said macromolecular polyanion sodium alginate is incorporated at a ratio of 4-6 wt. % per rubber component of the latex.

* * * * *